United States Patent
Darbari et al.

(10) Patent No.: US 10,325,044 B2
(45) Date of Patent: Jun. 18, 2019

(54) CONTROL PATH VERIFICATION OF HARDWARE DESIGN FOR PIPELINED PROCESS

(71) Applicant: Imagination Technologies Limited, Kings Langley (GB)

(72) Inventors: Ashish Darbari, Abbots Langley (GB); Sam Elliott, London (GB)

(73) Assignee: Imagination Technologies Limited, Kings Langley (GB)

(*) Notice: Subject to any disclaimer, the term of this patent is extended or adjusted under 35 U.S.C. 154(b) by 106 days.

(21) Appl. No.: 15/143,772

(22) Filed: May 2, 2016

(65) Prior Publication Data

US 2016/0321386 A1 Nov. 3, 2016

(30) Foreign Application Priority Data

May 1, 2015 (GB) .................................. 1507571.6

(51) Int. Cl.
*G06F 17/50* (2006.01)

(52) U.S. Cl.
CPC ...... *G06F 17/5031* (2013.01); *G06F 17/5022* (2013.01); *G06F 2217/84* (2013.01)

(58) Field of Classification Search
USPC ........................................................ 716/107
See application file for complete search history.

(56) References Cited

U.S. PATENT DOCUMENTS

| | | |
|---|---|---|
| 5,809,450 A | 9/1998 | Chrysos et al. |
| 5,987,598 A | 11/1999 | Levine et al. |
| 8,739,092 B1 | 5/2014 | Ben-Tzur et al. |
| 2007/0220339 A1* | 9/2007 | Buchonina ............ G06F 11/263 714/33 |
| 2008/0052584 A1* | 2/2008 | Doi ....................... G01R 31/319 714/736 |
| 2009/0235223 A1* | 9/2009 | Kakui .................. G06F 17/5022 716/104 |

(Continued)

FOREIGN PATENT DOCUMENTS

GB 2508233 A 5/2014

OTHER PUBLICATIONS

Kim et al., "Performance Simulation Modeling for Fast Evaluation of Pipelined Scalar Processor by Evaluation Reuse," Design Automation Conference Proceedings, ACM 2005, pp. 341-344.

(Continued)

*Primary Examiner* — Bryce M Aisaka
(74) *Attorney, Agent, or Firm* — Vorys, Sater, Seymour and Pease LLP; Vincent M DeLuca

(57) ABSTRACT

Methods and systems for verifying that logic for implementing a pipelined process in hardware correctly moves data through the pipelined process. The method includes: (a) monitoring data input to the pipelined process to determine when watched data has been input to the pipelined process; (b) in response to determining the watched data has been input to the pipelined process counting a number of progressing clock cycles for the watched data; and (c) evaluating an assertion written in an assertion based language, the assertion establishing that when the watched data is output from the pipelined process the counted number of progressing clock cycles for the watched data should be equal to one of one or more predetermined values.

18 Claims, 14 Drawing Sheets

(56) References Cited

U.S. PATENT DOCUMENTS

2012/0110310 A1    5/2012   Kirschbaum et al.

OTHER PUBLICATIONS

Yang et al., "Automatic Verification of External Interrupt Behaviours for Microprocessor Design," IEEE Transactions on Computer-Aided Design of Integrated Circuits and Systems, vol. 27, No. 9, Sep. 2008, pp. 1670-1683.

* cited by examiner

CONTROL PATH VERIFICATION OF HARDWARE DESIGN FOR PIPELINED PROCESS

BACKGROUND

A pipeline in data processing refers to a set of processing elements where the output of one element is the input of another element. Pipelining a process involves dividing the process into a number of stages. Pipelining allows throughput to be increased as it enables different stages of the process to be executed simultaneously on two sets of data instead of waiting for the whole process to be completed for the first set of data before executing the process for the second set of data. Many electronic devices, such as system-on-chips (SoCs), include hardware components for implementing one or more pipelined processes.

Such devices are not typically implemented in hardware (e.g. silicon) until their hardware designs are verified because post-silicon error discovery can be very expensive. Where a hardware design includes logic for implementing a pipelined process in hardware, verifying the design includes verifying the logic for implementing the pipelined process.

Typically the logic for implementing a pipelined process in hardware is verified through data path verification. This involves determining that the data payload output from the pipelined process is correct. The data payload may or may not go through a functional transformation as it moves through the pipeline. For example, in some cases, two operands in a pipelined arithmetic process may go through addition or subtraction. Accordingly, data path verification includes establishing that the output data is correct (i.e. that any functional transformations are correct).

The embodiments described below are provided by way of example only and are not limiting to implementations which solve any or all of the disadvantages of known verification methods and systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for verifying logic for implementing a pipelined process in hardware. In particular, the verification checks that the logic correctly moves data through the pipelined process. The method includes: (a) monitoring data input to the pipelined process to determine when watched data has been input to the pipelined process; (b) in response to determining that watched data has been input to the pipelined process counting a number of progressing clock cycles for the watched data; and (c) evaluating an assertion written in an assertion based language, the assertion establishing that when the watched data is output from the pipelined process the counted number of progressing clock cycles for the watched data is equal to one of one or more predetermined numbers of clock cycles.

A first aspect provides a computer-implemented method of generating a hardware design to implement a pipelined process in hardware, the method comprising, in a processing module: receiving an initial hardware design comprising logic to implement the pipelined process in hardware; determining whether the logic to implement the pipelined process in hardware correctly moves data through the pipelined process by: (a) monitoring data input to the pipelined process to determine when watched data has been input to the pipelined process; (b) in response to determining the watched data has been input to the pipelined process, counting a number of progressing clock cycles for the watched data; and (c) evaluating an assertion written in an assertion based language, the assertion establishing that when the watched data is output from the pipelined process the counted number of progressing clock cycles for the watched data is equal to one of one or more predetermined numbers of clock cycles; and in response to determining the logic for implementing the pipelined process in hardware does not correctly move data through the pipelined process, modifying the initial hardware design.

A second aspect provides a method of generating hardware to implement a pipelined process, the method comprising: receiving at a verification system, a hardware design comprising logic for implementing the pipelined process in hardware; determining, at the verification system, whether the logic for implementing the pipelined process in hardware correctly moves data through the pipelined process by: (a) monitoring data input to the pipelined process to determine when watched data has been input to the pipelined process; (b) in response to determining the watched data has been input to the pipelined process, counting a number of progressing clock cycles for the watched data; and (c) evaluating an assertion written in an assertion based language, the assertion establishing that when watched data is output from the pipelined process the counted number of progressing clock cycles for the watched data is equal to one of one or more predetermined numbers of clock cycles; and in response to determining the logic correctly moves data through the pipelined process, implementing the hardware design in hardware.

A third aspect provides a computer-implemented method to determine whether logic for implementing a pipelined process in hardware correctly moves data through the pipelined process, the method comprising, in a processing module: (a) monitoring data input to the pipelined process to determine when watched data has been input to the pipelined process; (b) in response to determining the watched data has been input to the pipelined process, counting a number of progressing clock cycles for the watched data; and (c) evaluating an assertion written in an assertion based language, the assertion establishing that when the watched data is output from the pipelined process the counted number of progressing clock cycles for the watched data is equal to one of one or more predetermined numbers of clock cycles.

A fourth aspect provides a pipeline control path verification system to determine whether logic for implementing a pipelined process in hardware correctly moves data through the pipelined process, the system comprising: input logic configured to monitor data input to the pipelined process to determine when watched data has been input to the pipelined process; clock counter tracking logic configured to, in response to determining the watched data has been input to the pipelined process, count a number of progressing clock cycles for the watched data; and assertion evaluation logic configured to evaluate an assertion written in an assertion based language, the assertion establishing that when the watched data is output from the pipelined process the counted number of progressing clock cycles for the watched data is equal to one of one or more predetermined numbers of clock cycles.

A fifth aspect provides a non-transitory computer readable storage medium having stored thereon computer executable program instructions that when executed causes at least one processor to perform the method of the third aspect.

The methods described herein may be performed by a computer configured with software in machine readable form stored on a non-transitory storage medium e.g. in the form of a computer program comprising computer readable program instructions for configuring a computer to perform the constituent portions of described methods or in the form of a computer program comprising computer program instructions adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software as embedded on a non-transitory computer readable storage medium, which runs on or controls "dumb" or standard hardware, to carry out the desired functions. It is also intended to encompass software which "describes" or defines the configuration of hardware, such as HDL (hardware description language) software as embodied in a non-transitory computer readable storage medium, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
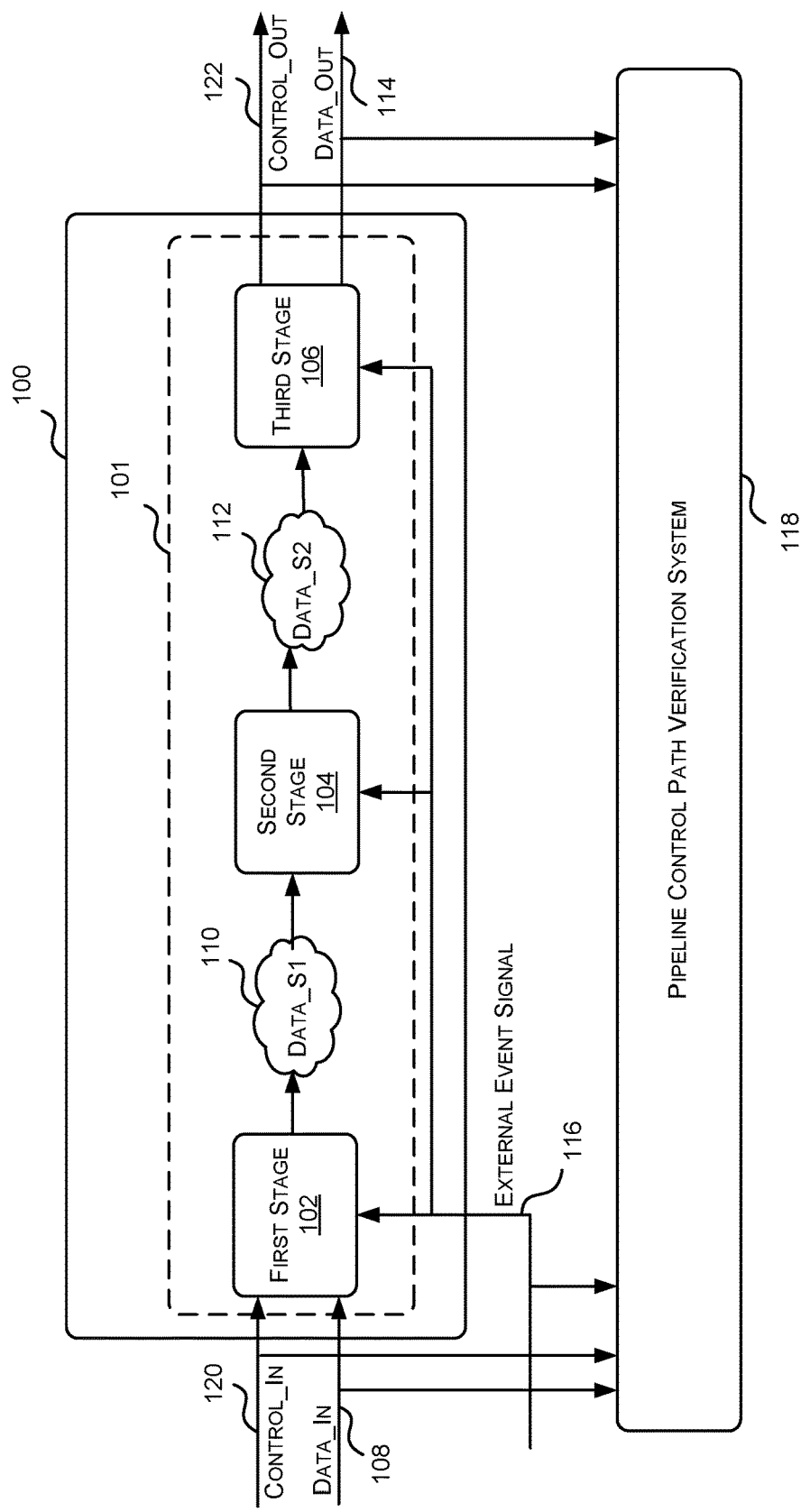
FIG. 1 is a schematic diagram of an example hardware design comprising logic for implementing a pipelined process in hardware.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, one method to verify logic for implementing a pipelined process in hardware is to perform data path verification on the logic. In particular, data path verification confirms that the data output from the pipelined process is correct (i.e. that the pipelined process has transformed the input data as expected). For example, if a pipelined process is designed to add A+B then data path verification of logic to implement the pipelined process in hardware confirms that when A and B are input to the hardware that the sum A+B will be output from the hardware.

However, to correctly perform data path verification the verification system must know which output relates to which input. In particular, a pipelined process is divided into a plurality of stages. Typically each stage takes at least one clock cycle to complete which means that there will be a delay from the time that data is input to the pipeline to the time that the corresponding data is output from the pipeline. Accordingly, in a three stage pipeline it would generally be expected that the data corresponding to a particular input would be output three clock cycles after it was input to the pipeline. Only if data is output when expected (e.g. in three clock cycles from when it is input in this 3-stage pipeline example) can data path verification be performed.

Data is moved through a pipeline (i.e. from one stage to the next) via control logic. If the control logic is not moving data through the pipeline correctly then it would be impossible to predict which data would be output at what time, rendering data path verification useless. Accordingly, in addition to performing data path verification it is also important to verify that data is being moved through the pipeline as expected (i.e. that data is output from the pipeline when expected). Verifying the operation of the control logic is referred to as control path verification.

Control path verification may be accomplished, by for example, tracking identifiers associated with the input and output data (e.g. via a transaction identifier) to ensure that the correct identifier is output from the pipeline at the correct time (e.g. when expected). However, exhaustively establishing the correctness of such time dependent behavior for a pipelined design using simulation-based verification is non-trivial due to the number of possible combinations that have to be simulated. For example, if a w-wide identifier is input to the pipeline, there are $2^w$ explicit combinations of identifiers. Each of those possible identifiers then need to be sent in all possible permutations (to cover all sequences) to check that the timing itself is correct across the pipeline. Clearly, the longer or deeper (e.g. the more stages of) the pipeline the more possible permutations there are.

The problem gets further complicated by the fact that data is not always output in the predetermined or expected number of clock cycles. In particular, as discussed above, if data is input into a simple three-stage pipeline the corresponding output data may be expected to be output in three clock cycles. However, there may be random external events, such as stalls or interrupts, which affect the movement of data through the pipeline by one or more clock cycles. This adds a further layer of complexity to the already difficult verification problem, rendering an exhaustive dynamic simulation-based solution infeasible.

It has been identified that control path verification can be simplified by basing the verification on the number of progressing clock cycles. A progressing clock cycle for particular data is a clock cycle in which the particular data moves from one stage in the pipeline to another (e.g. the particular data moves from one stage in the pipeline to the next or following stage in the pipeline; or the particular data moves back to the beginning of the pipeline (e.g. during an iterative process)). This is in contrast to a non-progressing clock cycle for the particular data in which the particular data does not move to another stage in the pipeline (e.g. the particular data stays at the same stage in the pipeline). A non-progressing clock cycle for the particular data may be caused by a random event such as a stall or an interrupt, but it will be evident to a person of skill in the art that it may be caused by other events. Since the number of progressing clock cycles expected for data to be output from a pipeline can be accurately predicted (e.g. based on the number of stages in the pipeline) by basing verification on the number of progressing clock cycles and ignoring the unpredictable non-progressing clock-cycles, the control path of a pipeline can be exhaustively verified.

Accordingly, described herein are methods and systems for verifying that logic for implementing a pipelined process in hardware correctly moves data through the pipelined process by tracking or counting the number of progressing clock cycles that occur for particular data after the particular data has been input to the pipelined process. The system verifies that the particular data is output when expected by comparing, using an assertion written in an assertion-based language, the counted number of progressing clock cycles for the particular data to one or more expected numbers of clock cycles when the particular data is output from the pipeline.

Reference is now made to FIG. 1 which illustrates an example hardware design 100 comprising logic 101 for implementing a pipelined process in hardware. The term "hardware design" is used herein to refer to an analog or digital implementation of a functional specification (e.g. user specified functionality) for an electronic device (e.g. a processor) that is ultimately implemented in hardware (e.g. synthesized into silicon or put on a field-programmable gate array (FPGA)). A hardware design may be implemented in a high level hardware description language (HDL), such as, but not limited to a register transfer language (RTL). Examples of register transfer languages include, but are not limited to, VHDL (VHSIC Hardware Description Language) and Verilog. It will be evident to a person of skill in the art that other high level languages may be used such as proprietary high level languages.

In the example shown in FIG. 1 the process is pipelined or divided into three stages 102, 104 and 106. During normal operation each stage 102, 104 or 106 respectively receives and processes input data 108, 110, or 112 in one clock cycle and respectively outputs data 110, 112 or 114 corresponding to the processed input in a next clock cycle.

To verify the control path of a pipeline it is the data identifier (e.g. transaction identifier) associated with the data payload (i.e. the data that is manipulated or transformed), not the data payload itself that is relevant. In particular, the identifier enables data to be tracked through the pipeline. Accordingly, the data referred to herein (e.g. Data_In 108, Data_S1 110, Data_S2 112, and Data_Out 114) is the data identifier, not the data payload. The methods and systems described herein are designed to test hardware designs in which the data identifiers remain unchanged and unique as they move through the pipeline; and as a data identifier moves through the pipeline its corresponding data payload is also moved.

Figure 2:
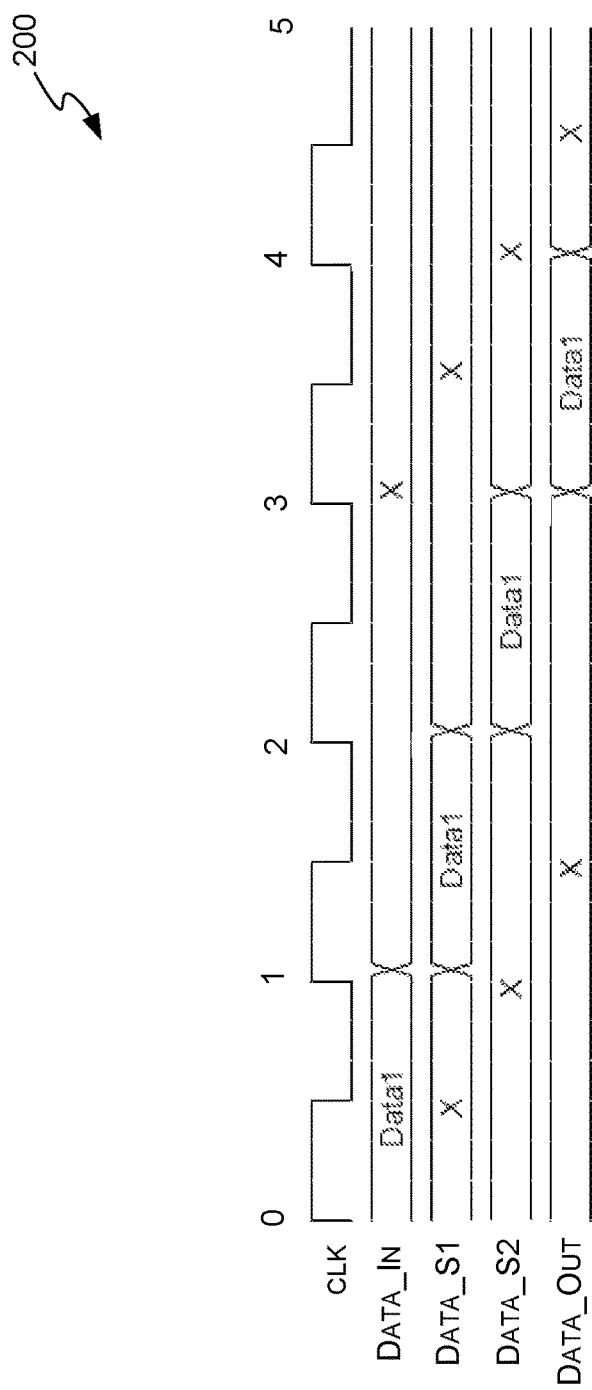
FIG. 2 is a timing diagram illustrating the movement of data through the pipelined process of FIG. 1 during normal operation.

An example of how data moves through the pipeline of FIG. 1 during normal operation is illustrated in the timing diagram 200 of FIG. 2. In particular, in clock cycle 0 the input to the pipeline (Data_In 108) is equal to the identifier 'Data 1' which is processed by the first stage 102. In clock cycle 1 the first stage 102 outputs 'Data 1' (i.e. Data_S1 110 is equal to 'Data1') which is processed by the second stage 104. In clock cycle 2 the second stage 104 outputs 'Data1' (i.e. Data_S2 112 is equal to Data1') which is processed by the third stage 106. In clock cycle 3 the third stage 106 outputs 'Data1' (i.e. Data_Out 114 is equal to 'Data1'). Accordingly, during normal operation 'Data1' can be seen on the output (Data_Out 114) three clock cycles after it has been input (i.e. Data_In 108 is equal to 'Data1').

However, as described above, there may be unpredictable or random events that occur that affect the progression of data through the pipeline. Such events can delay data from reaching the output by one or more clock cycles. For example, a stall event may prevent one or more stages of the pipeline from processing new data in a particular clock cycle causing some or all of the data in the pipeline to remain at its current stage and not to progress to the next stage during that clock cycle. In another example, an interrupt may cause the pipeline to be flushed meaning that the data in the pipeline is deleted or wiped out.

A clock cycle in which particular data does not advance or progress through the pipeline (e.g. the particular data stays at the same stage or goes back one or more stages (e.g. restarts)) is referred to herein as a non-progressing clock cycle for the particular data. Non-progressing clock-cycles for particular data are distinguished from progressing clock cycles for particular data in which the particular data advances or progresses through the pipeline (e.g. a clock cycle in which the particular data moves to the next stage of the pipeline).

Stalls and interrupts will be used herein as examples of random events which affect the progression of data through a pipeline, but it will be evident to a person of skill in the art that the methods and systems described herein may be adapted to take into account any other event which affects the progression of data through the pipeline. The random or unpredictable events that affect the progression of data through the pipeline may be signaled to the hardware design 100 via one or more external event signals 116, such as a stall signal or an interrupt signal.

It will be evident to a person of skill in the art that random events such as stalls and interrupts may affect all the data in the pipeline or only some of the data in the pipeline. For example, there may be a global stall signal that stalls all data in the pipeline and/or there may be a local stall signal for each stage in the pipeline that only stalls the data associated with the associated pipeline stage. Accordingly, it may be possible for a particular clock cycle to be a non-progressing clock cycle for some data in the pipeline, but not for other data in the pipeline. For example, in a five-stage pipeline there may be a clock cycle in which the data at stage 3 is stalled, the data at stage 2 is flushed, but all other data in the pipeline progresses normally. Therefore the data at stages 2 and 3 experience a non-progressing clock cycle and the data at all other stages of the pipeline experience a progressing clock cycle.

Figure 3:
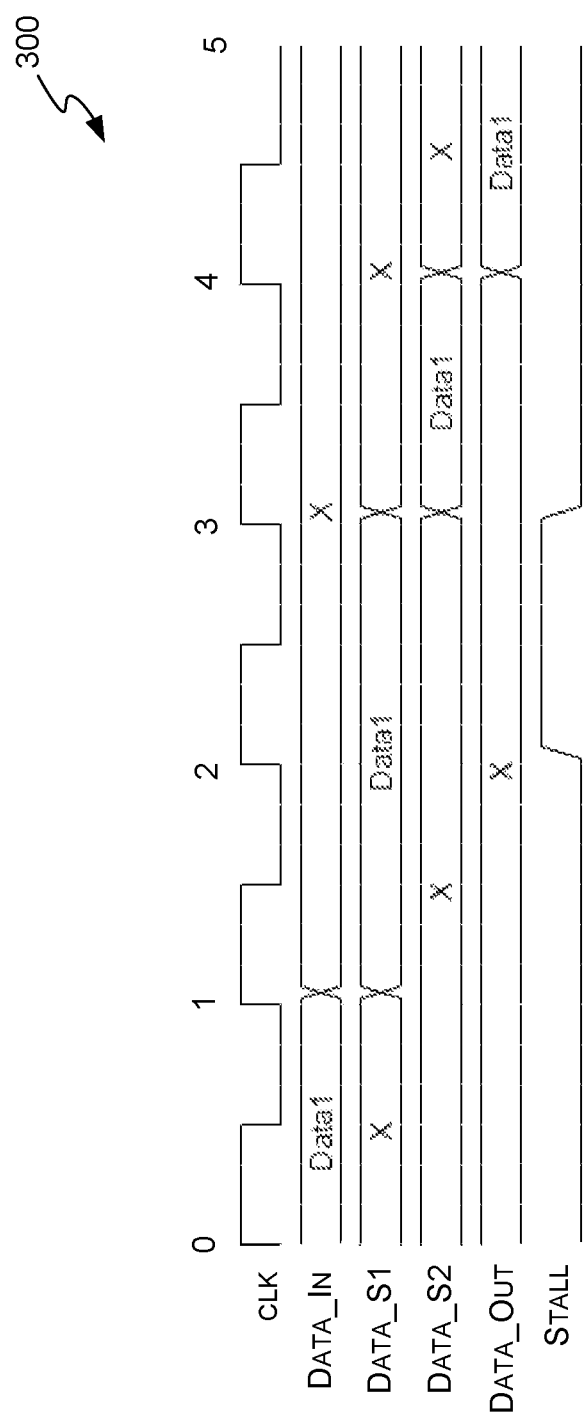
FIG. 3 is a timing diagram illustrating the movement of data through the pipelined process of FIG. 1 when there is a stall.

An example of how a stall affects the progression of particular data through the pipeline is illustrated in the timing diagram 300 of FIG. 3. In particular, in clock cycle 0 the input data (Data_In 108) is equal to identifier 'Data1' which is processed by the first stage 102. In clock cycle 1 the first stage 102 outputs 'Data 1' (i.e. Data_S1 110 is equal to 'Data1') which is processed by the second stage 104. In clock cycle 2 a stall occurs which causes the data in the pipeline to remain at its current stage (e.g. 'Data1' remains the output of the first stage 102). Clock cycle 2 is therefore a non-progressing clock cycle for 'Data1'. In clock cycle 3, after the stall is over, the pipeline resumes normal operation—i.e. the second stage 104 outputs 'Data1' (i.e. Data_S2 is equal to 'Data1') which is processed by the third stage 106. In clock cycle 4 the third stage 106 outputs 'Data1' (i.e. Data_Out 114 is equal to 'Data1'). Accordingly in this example 'Data1' is seen on the output (i.e. Data_Out 114) four clock cycles after it has been input (i.e. Data_In 108) to the pipeline.

Although 'Data1' is output after three clock cycles in the example of FIG. 2 and after four clock cycles in the example of FIG. 3, in both cases Data1' is output after three progressing clock cycles for 'Data1'. Accordingly the control path of a pipeline can be verified by ensuring that the data is output after a predetermined number of progressing clock cycles. In some cases, as in the examples of FIGS. 1 to 3, the predetermined number will be equal to the number of stages in the pipeline. However, in other examples, the predetermined number may be fewer or more than the number of stages in the pipeline.

In one example, a process may be iterative; therefore it may take data several passes through the pipeline before it is output. In another example, some data may not need to be processed by all stages of the pipeline (e.g. the data may bypass a certain stage or stages—for example, if a negative number is input to a square root function the answer need not be calculated because the operation is invalid, so the pipeline process may skip to the end), and other data may need to go through some stages more than once. In yet another example, the pipelined process may have more than one output port and it may take a different number of cycles for data to appear at different output ports. For example, it may be expected to take three progressing clock cycles for data to appear on a first output port, but six progressing clock cycles for data to appear on a second output port.

Although in the example described with reference to FIGS. 1 to 3, data is always expected to be output from the pipelined process after three progressing clock cycles, in other cases there may be multiple possible clock cycles when the data may be validly output. In particular, it may be possible for the data to be output after 5 clock cycles or 10 clock cycles. For example, where data takes more than one pass through the pipeline before it is output, the number of passes may be based on the input data. Thus if there are 5 stages to the pipeline then data may be validly output after 5, 10, 15, 20 etc. clock cycles. In these cases there is a typically a maximum number of iterations thus a closed list of predetermined or expected numbers of clock cycles can be defined.

Accordingly, to verify that logic for implementing a pipelined process in hardware correctly progresses data through the pipeline, a pipeline control path verification system 118 is configured to count the number of progressing clock cycles that occur for specific data once the specific data enters the pipeline. If the specific data is output from the pipelined process when the counted number of progressing clock cycles equals the predetermined number of progressing clock cycles (or one of a plurality of predetermined or expected numbers of progressing clock cycles) then the specific data has been output from the pipelined process at the correct time. An example of the verification method which may be executed by the pipeline control path verification system 118 is described with reference to FIG. 4.

Figure 4:
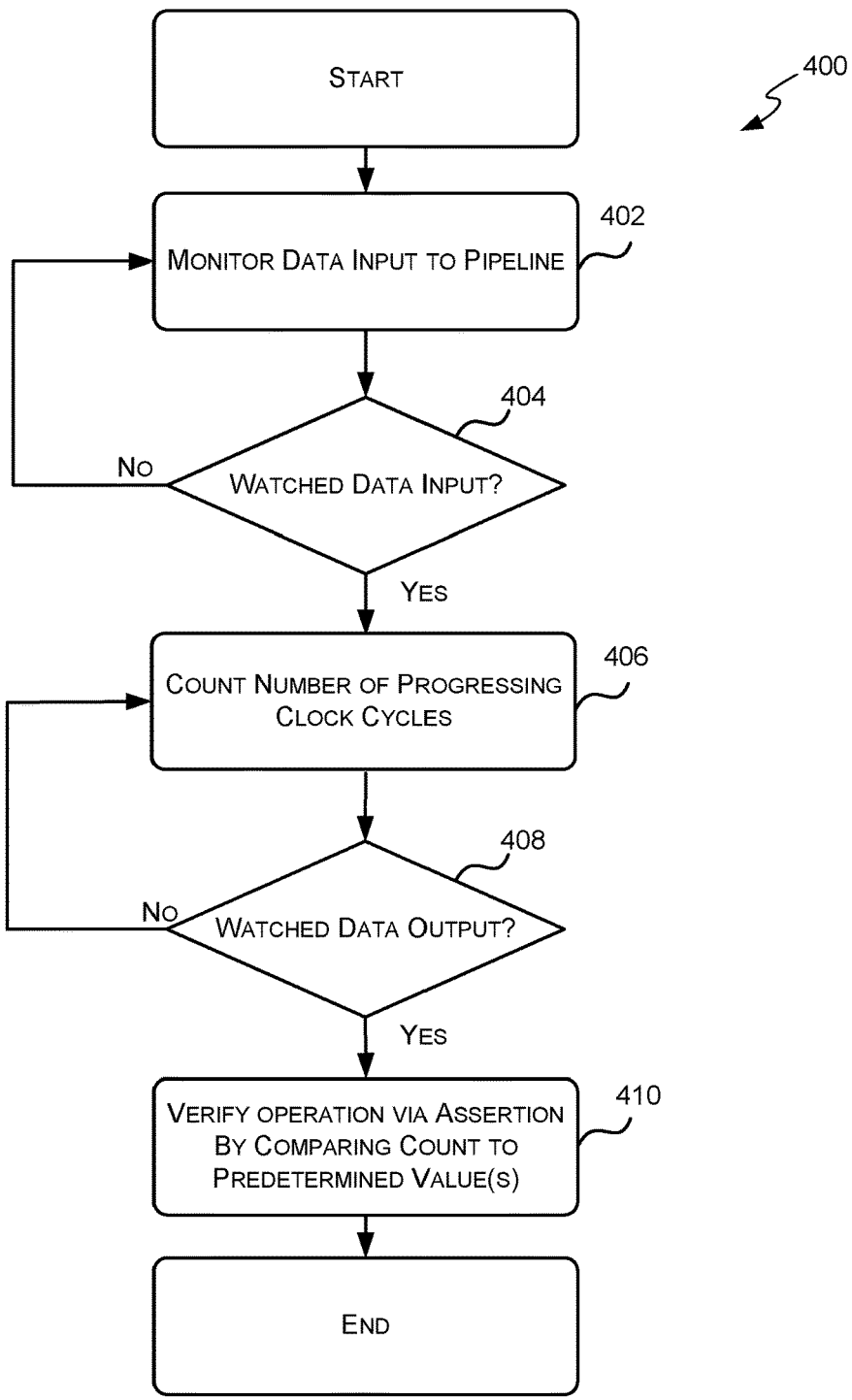
FIG. 4 is a flow diagram of an example method for verifying the logic for implementing a pipelined process in hardware.

Reference is now made to FIG. 4 which illustrates a method 400 of verifying that logic for implementing a pipelined process in hardware correctly moves data through the pipeline by counting the number of progressing clock cycles that occur for particular data between the particular data being input to the pipeline and the particular data being output from the pipeline. The method 400 may be implemented by the pipeline control path verification system 118 of FIG. 1.

The method 400 begins at block 402 where the pipeline control path verification system 118 monitors the data input to the pipelined process to determine (at block 404) when watched data has been input to the pipelined process. The term "watched data" is used herein to represent a specific value for the input data (i.e. identifier). In some cases the pipeline control path verification system 118 monitors the data input (e.g. Data_In 108) and the input control signal(s) (e.g. Control_In 120) to the pipelined process and determines that the watched data has been input to the pipelined process when the input data (e.g. Data_In 108) is equal to the watched data and when the control signal(s) (e.g. Control_In 120) is/are in a particular state.

For example, in some cases, data may only be input into the pipelined process when a valid control signal is received indicating the supplied data is valid and an enable signal is transmitted or output indicating the pipelined process is ready to receive data. In these cases, the pipeline control path verification system 118 may determine that the watched data has been input to the pipelined process when the input data (e.g. Data_In 108) is equal to the watched data and an enable signal is high and a valid signal is high. However, it will be evident to a person of skill in the art that other control signals may be used and the actual control signals may be determined by the components sending and receiving the data.

If it has been determined at block 404 that the watched data has not been input to the pipelined process, the method 400 proceeds back to block 402 where the pipeline control path verification system 118 continues to monitor the input to the pipelined process for the watched data. If, however, it has been determined at block 404 that the watched data has been input to the pipelined process then the method 400 proceeds to block 406.

At block 406, once the pipeline control path verification system 118 has determined that the watched data has been input to the pipelined process, the pipeline control path verification system 118 tracks the number of progressing clock cycles that occur for the watched data until the watched data is output from the pipelined process. In particular, each clock cycle the pipeline control path verification system 118 determines, at least based on the external event signal(s) (e.g. external event signals 116), whether the clock cycle is a progressing clock cycle or a non-progressing clock cycle for the watched data. As described above, a progressing clock cycle for the watched data is a clock cycle in which the watched data progresses through the pipeline (i.e. the watched data advances to the next pipeline stage). Conversely, a non-progressing clock cycle for the watched data is one in which the watched data does not progress through the pipeline (e.g. the watched data may stay at the same stage of the pipeline (e.g. due to a stall), or it may go back to an earlier stage of the pipeline (e.g. due to an interrupt)).

If the pipeline control path verification system 118 has determined that the clock cycle is a progressing clock cycle for the watched data (e.g. no external event signal has been received that affects the watched data and thus the watched data will progress through the pipeline as normal) then the pipeline control path verification system 118 may increment a counter used to keep track of the number of progressing clock cycles for the watched data. If however, the pipeline control path verification system 118 has determined that the clock cycle is a non-progressing clock cycle for the watched data (e.g. an external event signal has been received that affects the watched data and thus the watched data will not progress through the pipeline) then the counter is not incremented and one or more actions may be taken based on the type of external event. For example, if the external event is a stall no further action is taken. If however, the external event is an interrupt which causes the pipeline to be flushed then the counter may be reset. An example of a method of tracking the number of progressing clock cycles for the watched data will be described with reference to FIG. 8.

Once the pipeline control path verification system 118 has made a determination as to whether the current clock cycle is a progressing or non-progressing clock cycle for the watched data and taken the appropriate action, the method 400 proceeds to block 408.

At block 408, the pipeline control path verification system 118 determines whether the watched data has been output from the pipelined process. If it is determined that the watched data has not been output from the pipelined process the method 400 proceeds back to block 406 where the pipeline control path verification system 118 continues to count the number of progressing clock cycles for the watched data. If, however, it is determined that the watched data has been output from the pipelined process the method proceeds to block 410.

At block 410, the pipeline control path verification system 118 determines whether the number of progressing clock cycles that have occurred for the watched data since the watched data was input to the pipelined process is equal to a predetermined number (or one of a plurality of predetermined numbers). Each predetermined number represents the number of progressing clock cycles for data input to the pipelined process to reach the particular output port of interest of the pipelined process. The predetermined number may be the number of stages in the pipeline or it may be another number. If the counted number of progressing clock cycles for the watched data is not equal to the predetermined number (or one of a plurality of predetermined numbers) then an error has occurred.

This is verified by evaluating an assertion.

As is known to those of skill in the art an assertion is a statement about a specific property that is expected to hold for a design (i.e. is always true). In other words, an assertion is an expression that, if evaluated to be false on the design, indicates an error. Within HDL designs, an assertion is an executable statement that checks for specific behavior within the HDL design. For example if a design contains a FIFO (first in first out) buffer the designer would define assertions that capture the design intent (e.g. that neither overflow nor underflow of the FIFO may occur). In this case an assertion is defined that asserts that when the watched data is output from the pipelined process the number of progressing clock cycles that have occurred for the watched data since the watched data was input to the pipelined process is equal to the predetermined number of expected number of progressing clock cycles (or one of a plurality of predetermined numbers of clock cycles).

An assertion is typically written in an assertion language. Assertion languages include, but are not limited to, System Verilog (SV), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

If the watched data is output when the counted number of progressing clock cycles for the watched data is equal to the expected or predetermined number of progressing clock cycles (or one of a plurality of predetermined numbers of progressing clock cycles) then the watched data has been output at the expected or correct time and the control path of the pipelined process is working as expected. Otherwise the watched data has not been output at the correct time and there is an error in the control path of the pipelined process.

Use of an assertion to verify the operation of the control path of a pipeline allows the control path to be exhaustively verified. In particular, if the pipeline control path verification system 118 is executed in a formal model checker or formal verification tool, the formal model checker or formal verification tool evaluates every possible watched data value and every possible ordering permutation for that watched data value (e.g. the watched data value is the $1^{st}$, $2^{nd}$, $3^{rd}$, $4^{th}$, $5^{th}$, $6^{th}$ etc, data to be processed) to determine if the assertion is true.

Figure 5:
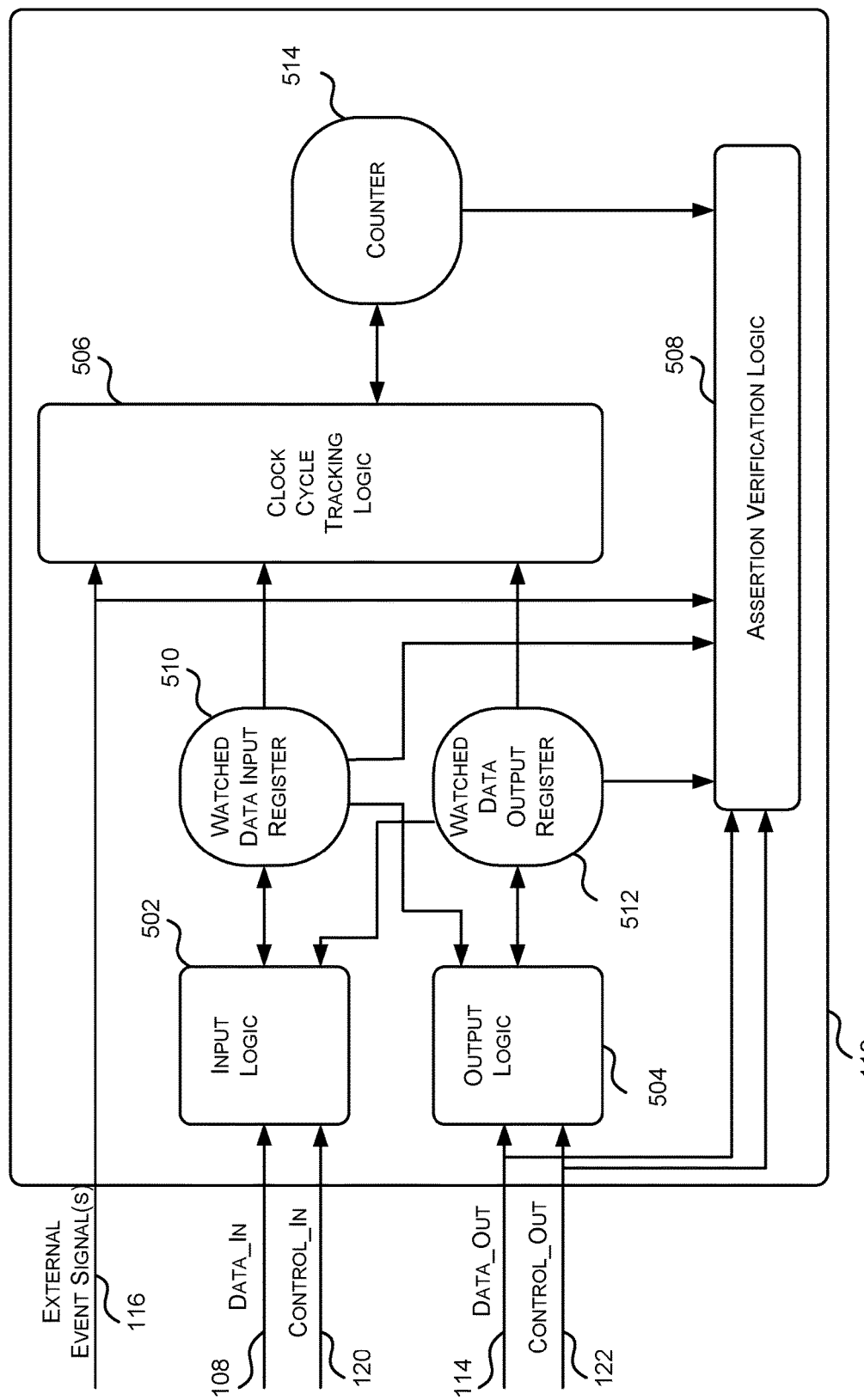
FIG. 5 is a block diagram of an example pipeline control path verification system for verifying the logic for implementing a pipelined process in hardware using the method of FIG. 4.

Reference is now made to FIG. 5 which illustrates an example implementation of the pipeline control path verification system 118 of FIG. 1 for executing the method 400 of FIG. 4. The example pipeline control path verification system 118 comprises input logic 502 for determining when the watched data has been input to the pipelined process; output logic 504 for determining when the watched data has been output from the pipelined process; clock cycle tracking logic 506 for tracking the number of progressing clock cycles for the watched data between input of the watched data to the pipelined process and output of the watched data from the pipelined process; and assertion verification logic 508 for determining whether the watched data is output at the correct time using an assertion. The assertion states or asserts that when the watched data is output from the pipelined process the number of progressing clock cycles that occurred for the watched data between input of the watched data to the pipelined process and output of the watched data from the pipelined process is equal to a predetermined or expected number (or one of a plurality of predetermined or expected numbers) of progressing clock cycles.

Each of the logic modules (e.g. the input logic 502, output logic 504, clock cycle tracking logic 506 and assertion verification logic 508) is controlled by a main clock (not shown). For example, in some cases the rising edge of the main clock triggers each of the logic modules to perform a function.

The input logic 502 is configured to maintain a watched data input register 510 which is used to indicate when the watched data has been input to the pipelined process, but not yet output from the pipelined process (e.g. when the watched data is pending in the pipelined process). In particular, the input logic 502 monitors the data input to the pipelined process (e.g. Data_In 108) and the input control signals to the pipelined process (e.g. Control_In 120) to determine when the watched data has been input to the pipelined process. When the input logic 502 detects that the watched data has been input to the pipelined process the watched data input register 510 may be set. When the input logic 502 subsequently receives an indication that the watched data has been output from the pipelined process (e.g. via the watched data output register 512 maintained by the output logic 504) the input logic 502 may reset the watched data input register 510.

Figure 6:
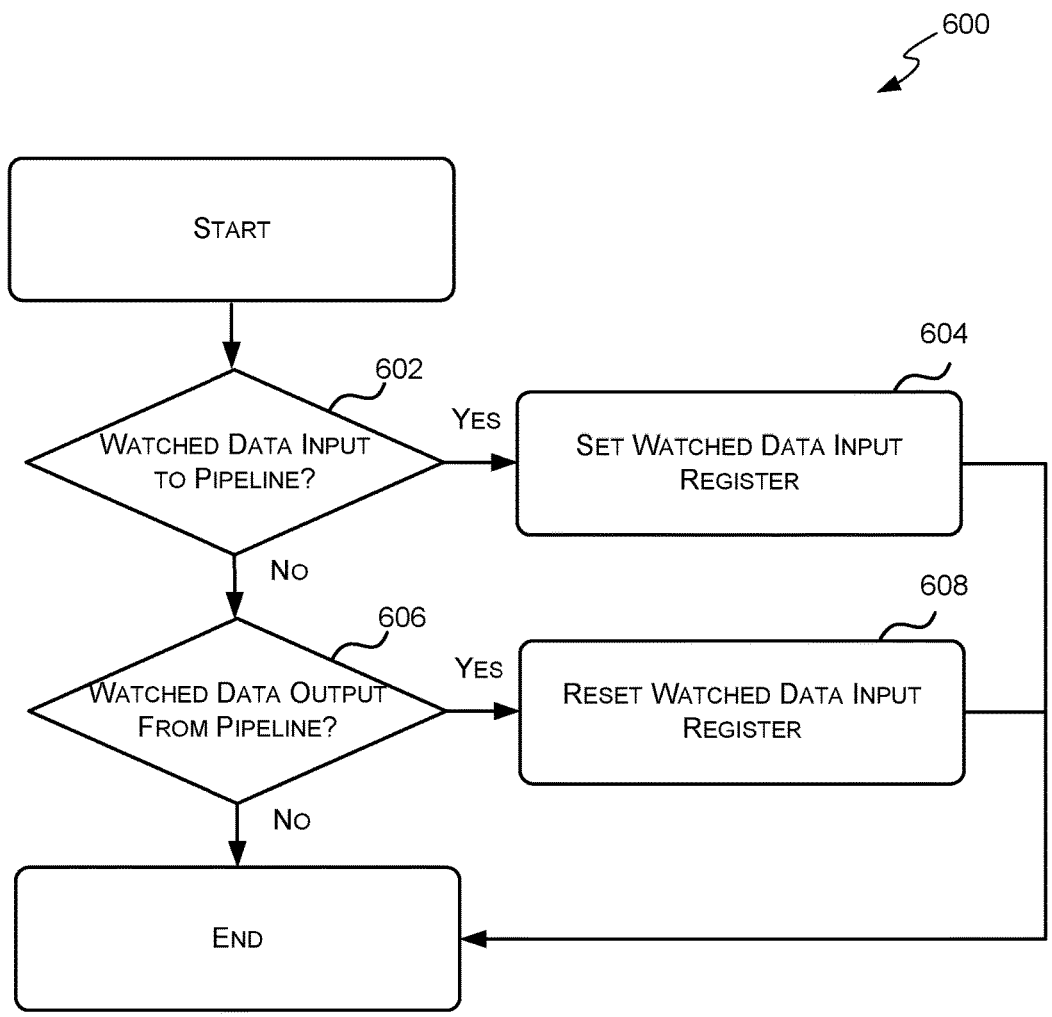
FIG. 6 is a flow diagram of an example method for monitoring the data input to a pipelined process.

Reference is now made to FIG. 6, which illustrates an example method 600 that may be implemented by the input logic 502 each clock cycle to maintain the watched data input register 510. The method 600 begins at block 602 where the input logic 502 determines whether the watched data has been input to the pipelined process in the current clock cycle. In some cases the input logic 502 may be configured to determine whether the watched data has been input to the pipelined process from the data input (e.g. Data_In 108) and the input control signal(s) (e.g. Control_In 120). For example, the input logic 502 may determine that the watched data has been input to the pipelined process when the data input (e.g. Data_In 108) is equal to the watched data and when the input control signal(s) (e.g. Control_In 120) is/are in a particular state. For example, the input logic 502 may determine that the watched data has been input to the pipelined process when the input data (e.g. Data_In 108) is equal to the watched data and an enable signal is high and a valid signal is high. However, it will be evident to a person of skill in the art that other control signals may be used and the actual control signals may be determined by the components sending and receiving the data.

If the input logic 502 determines that the watched data has been input to the pipelined process in the current clock cycle the method 600 proceeds to block 604 where the watched data input register 510 is set. In some cases the watched data input register 510 is set in the clock cycle following the clock cycle in which the watched data was input to the pipelined process. In other cases the watched data input register 510 is set in the same clock cycle in which the watched data was input to the pipelined process. Once the watched data input register 510 has been set the method 600 ends.

If, however, the input logic 502 determines that the watched data has not been input to the pipelined process in the current clock cycle the method 600 proceeds to block 606 where the input logic 502 determines whether the watched data has been output from the pipelined process. In some cases the input logic 502 may determine whether the watched data has been output from the pipelined process from the status of the watched data output register 512 maintained by the output logic 504. For example, the input logic 502 may determine that the watched data has been output if the watched data output register 512 is set and determine that the watched data has not been output if the watched data output register 512 is not set.

If the input logic 502 determines that the watched data has been output from the pipelined process (e.g. the watched data output register 512 is set) the method proceeds to block 608 where the input logic 502 resets the watched data input register 510. Once the watched data input register 510 has been reset, the method 600 ends.

Referring back to FIG. 5, the output logic 504 is configured to maintain a watched data output register 512 which is used to indicate when the watched data has been output from the pipelined process. In particular, the output logic 504 monitors the data output from the pipelined process (Data_Out 114) and the output control signal(s) of the pipelined process (e.g. Control_Out 122) to determine when the watched data has been output from the pipelined process. When the output logic 504 determines that the watched data has been output from the pipelined process after it has been detected as being input to the pipelined process (e.g. indicated by the watched data input register 510) the output logic 504 may set the watched data output register 512. In the subsequent clock cycle the output logic 504 may reset the watched data output register 512 so that the watched data output register 512 will be set for only a single clock cycle.

Figure 7:
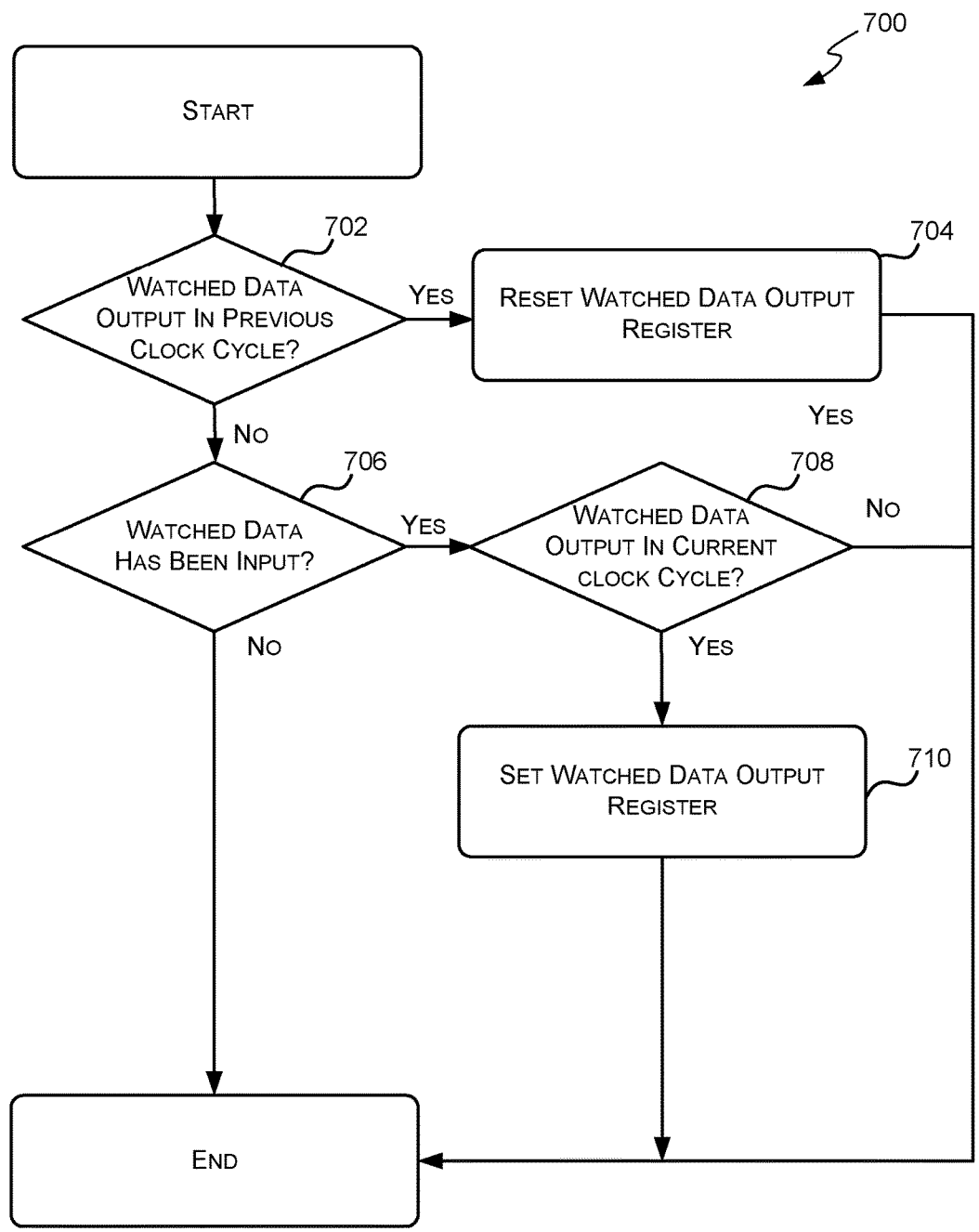
FIG. 7 is a flow diagram of an example method for monitoring the data output from a pipelined process.

Reference is now made to FIG. 7 which illustrates an example method 700 that may be implemented by the output logic 504 each clock cycle to maintain the watched data output register 512. The method 700 begins at block 702 where the output logic 504 determines whether the watched data was output in the previous clock cycle. In some cases the output logic 504 may be configured to determine whether the watched data was output in the previous clock cycle based on the status of the watched data output register 512. For example, if the watched data output register 512 is set the output logic 504 may determine that the watched data was output in the previous clock cycle. If it is determined that the watched data was output in the previous clock cycle then the method 700 proceeds to block 704 where the watched data output register 512 is reset.

If, however, it is determined that the watched data was not output in the previous clock cycle then the method proceeds to block 706 where the output logic 504 determines whether the watched data has been input to the pipelined process in a previous clock cycle. In some cases the output logic 504 determines whether the watched data has been input to pipelined process based on the status of the watched data input register 510. For example, if the watched data input register 510 is set the output logic 504 may determine that the watched data has been input to the pipelined process.

If it is determined that the watched data was previously input to the pipelined process, the method 700 proceeds to block 708 where the output logic 504 determines whether the watched data has been output from the pipelined process in the current clock cycle. In some cases the output logic 504 is configured to determine whether the watched data has been output from the pipelined process based on the data output from the pipelined process (e.g. Data_Out 114) and the output control signal(s) (Control_Out 122). In particular, the output logic 504 may determine that the watched data has been output from the pipelined process when the data output (e.g. Data_Out 114) is equal to the watched data and the output control signal(s) (e.g. Control_Out 122) is/are in a particular state. For example, the output logic 504 may determine that the watched data has been output from the pipelined process when the output data (e.g. Data_Out 114) is equal to the watched data and an enable signal is high and a valid signal is high. However, it will be evident to a person of skill in the art that other control signals may be used and the actual control signals may be determined by the components sending and receiving the data.

If the output logic 504 determines in block 708 that the watched value was not output in the current clock cycle then the method 700 ends. If, however, the output logic 504 determines in block 708 that the watched value has been output from the pipelined process in the current clock cycle the method 700 proceeds to block 710 where the output logic 504 sets the watched data output register 512. In some cases the watched data output register 512 is set in the clock cycle following the clock cycle in which the watched data was output from the pipelined process.

Referring back to FIG. 5, the clock cycle tracking logic 506 is configured to count the number of progressing clock cycles for the watched data that occur between the watched data being input to the pipelined process and the watched data being output from the pipelined process using a counter 514. In particular, for each clock cycle after the watched data has been input to the pipelined process (as indicated by the watched data input register 510) and not yet output by the pipelined process (as indicated by the watched data output register 512) the clock cycle tracking logic 506 determines, from at least the external event signal(s), whether the current clock cycle is a progressing clock cycle or a non-progressing clock cycle for the watched data. Where the clock cycle tracking logic 506 determines that the current clock cycle is a progressing clock cycle for the watched data the counter 514 is incremented. Where, however, the clock cycle tracking logic 506 determines that the clock cycle is a non-progressing clock cycle for the watched data then the counter 514 is not incremented and one or more other actions may be taken based on the cause of the non-progressing clock cycle. For example, if the non-progressing clock cycle is caused by an interrupt then the counter 514 may be reset.

Figure 8:
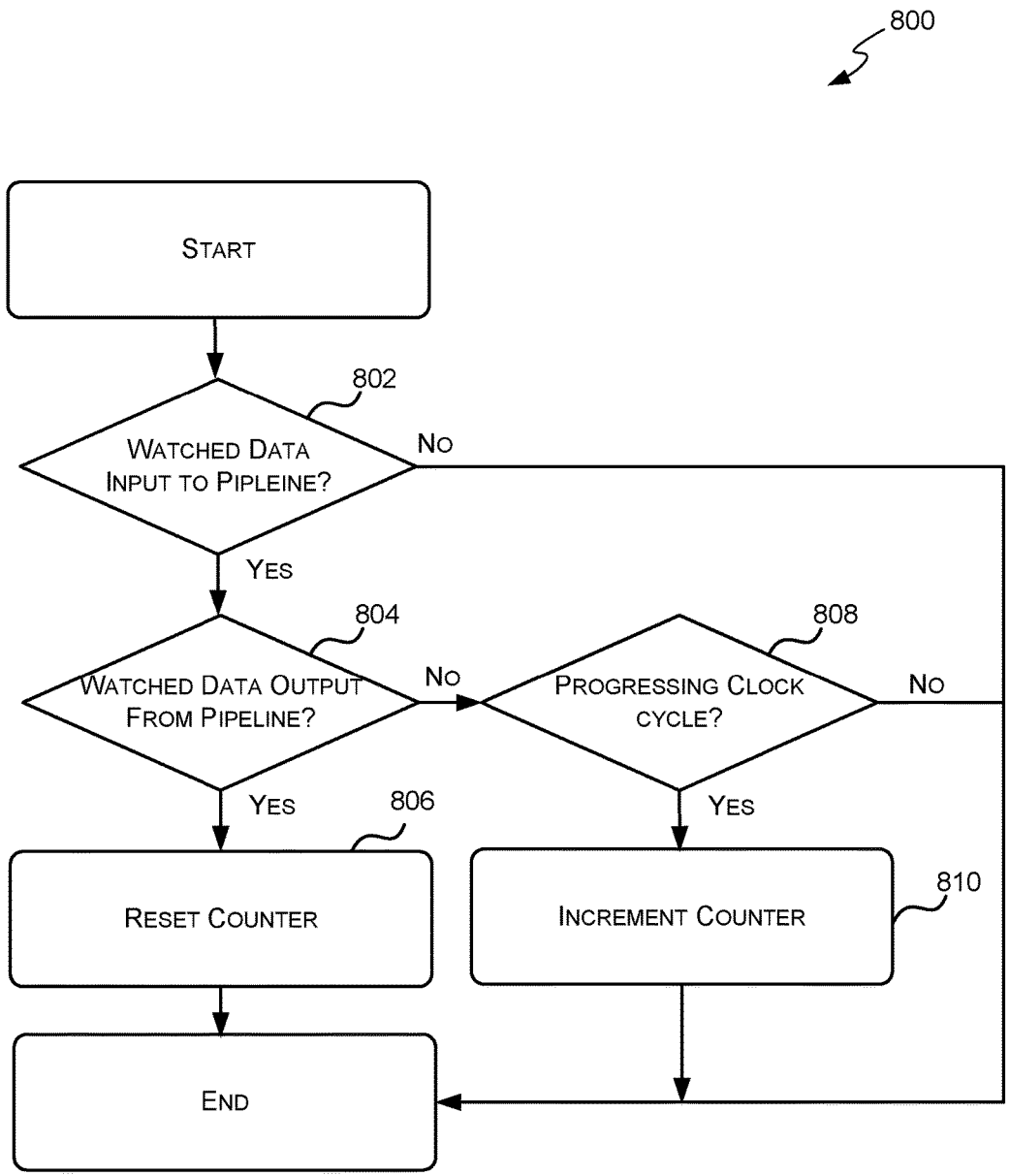
FIG. 8 is a flow diagram of an example method for tracking the number of progressing clock cycles for the watched data.

Reference is now made to FIG. 8 which illustrates an example method 800 of counting or tracking the number of progressing clock cycles for the watched data that occur between the watched data being input to the pipelined process and the watched data being output from the pipelined process which may be executed by the clock cycle tracking logic 506 each clock cycle. The method 800 begins at block 802 where the clock cycle tracking logic 506 determines whether the watched data has been input to the pipelined process in a previous clock cycle. In some cases the clock cycle tracking logic 506 may determine whether the watched data has been input to the pipelined process based on the status of the watched data input register 510. For example, when the watched data input register 510 is set the clock cycle tracking logic 506 may determine that the watched data has been input to the pipelined process.

If the clock cycle tracking logic 506 determines that the watched data has not been input to the pipelined process then the method 800 ends. If, however the clock cycle tracking logic 506 determines that the watched data has been input to the pipelined process the method 800 proceeds to block 804.

At block 804, the clock cycle tracking logic 506 determines whether the watched data has been output from the pipelined process. In some cases the clock cycle tracking logic determines whether the watched data has been output from the pipelined process based on the status of the watched data output register 512. For example, the clock cycle tracking logic 506 may determine that the watched data has been output from the pipelined process if the watched data output register 512 is set.

If the clock cycle tracking logic 506 determines in block 804 that the watched data has been output from the pipelined process the method 800 proceeds to block 806 where the counter is reset. If however, the clock cycle tracking logic 506 determines in block 804 that the watched data has not been output from the pipelined process the method 800 proceeds to block 808.

At block 808, the clock cycle tracking logic 506 determines whether the current clock cycle is a progressing clock cycle or a non-progressing clock cycle for the watched data. In some cases the clock cycle tracking logic 506 determines from at least the external event signal(s), whether the current clock cycle is a progressing clock cycle or a non-progressing clock cycle for the watched data. For example, in some cases the clock cycle tracking logic 506 analyzes the external event signal(s) to determine whether a predetermined event, such as a stall or an interrupt has occurred that affects the progress of the watched data through the pipeline. If one of the predetermined events has occurred then the clock cycle is a non-progressing clock cycle, otherwise, the current clock cycle is a progressing clock cycle.

If the clock cycle tracking logic 506 determines in block 808 that the current clock cycle is a progressing clock cycle for the watched data then the method 800 proceeds to block 810 where the counter 514 is incremented to indicate that another progressing clock cycle has occurred for the watched data. If, however, the clock cycle tracking logic 506 determines in block 808 that the current clock cycle is a non-progressing clock cycle for the watched data then one or more actions may be undertaken based on the cause of the non-progressing clock cycle. For example, where the non-progressing clock cycle is caused by a stall, then as shown in FIG. 8 the method 800 may simply end. If however, the non-progressing clock cycle is caused by, for example, an interrupt, the pipeline may be flushed and the counter reset.

Referring back to FIG. 5, the assertion verification logic 508 evaluates an assertion to confirm that the watched data is being output from the pipelined process at the correct or expected time. In particular, the assertion asserts that when the watched data is output from the pipelined process the number of progressing clock cycles that occurred for the watched data between input and output of the watched data to/from the pipelined process (indicated by the counter 514) is equal to a predetermined number (or one of a plurality of predetermined numbers) of progressing clock cycles. Accordingly, if the watched data is not output when the counter 514 is equal to the predetermined or expected number (or one of a plurality of predetermined or expected numbers) of progressing clock cycles then the assertion will fail indicating an error. If however, the watched data is output when the counter 514 is equal to the predetermined or expected number (or one of a plurality of predetermined or expected numbers) of progressing clock cycles then the assertion passes or stays true.

Figure 9:
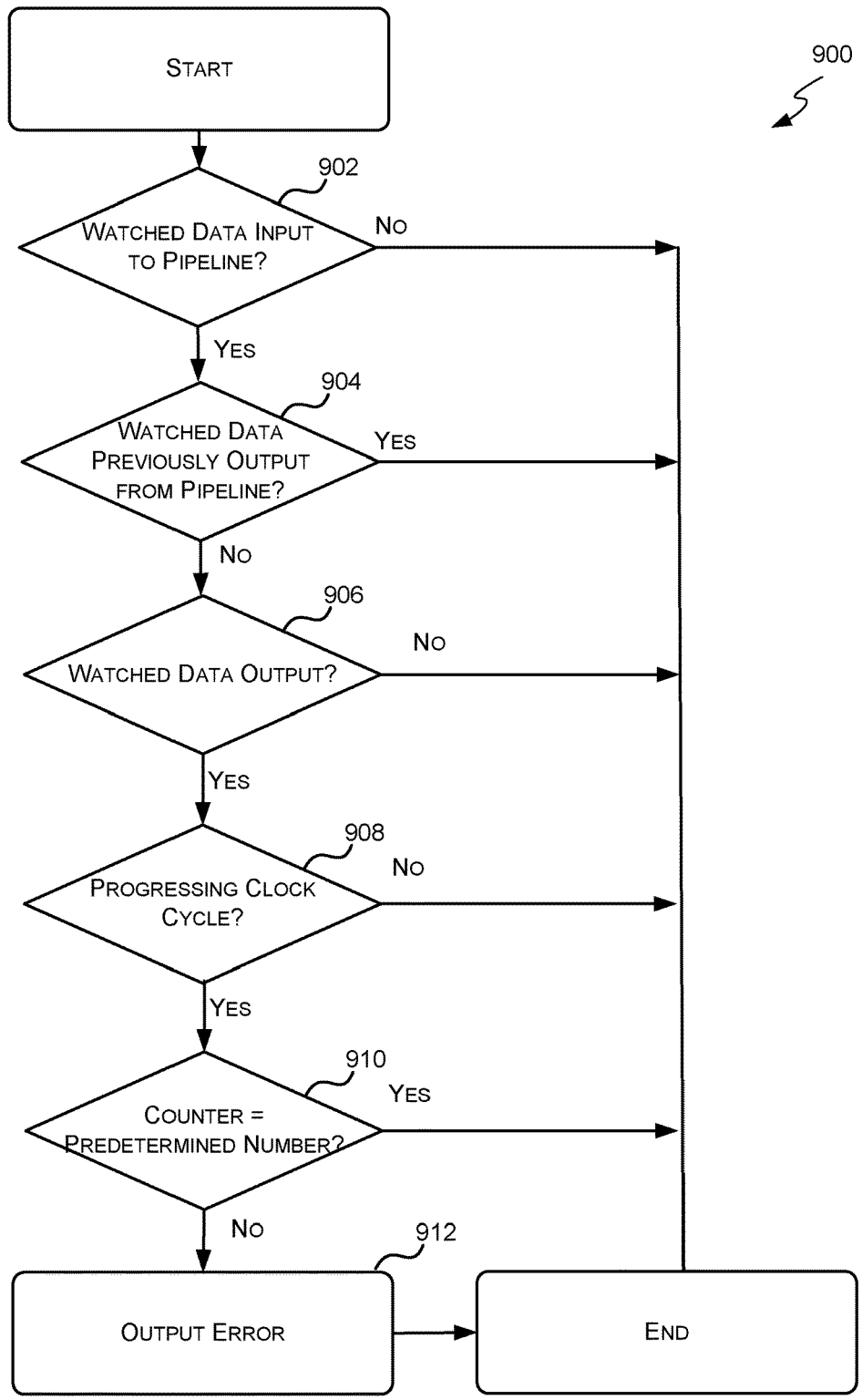
FIG. 9 is a flow diagram of an example method of evaluating an assertion to verify that data is output from the pipelined process at the expected time.

Reference is now made to FIG. 9, which illustrates a method 900 of verifying the control path of the pipeline which may be executed by the assertion verification logic 508 each clock cycle. The method 900 begins at block 902 where the assertion verification logic 508 determines whether the watched data has been input to the pipeline in a previous clock cycle. In some cases the assertion verification logic 508 may determine whether the watched data has been input to the pipelined process in a previous clock cycle based on the status of the watched data input register

510. For example, the assertion verification logic 508 may determine that the watched data has been input to the pipelined process if the watched data input register 510 is set. If the assertion verification logic 508 determines that the watched data has not been input to the pipelined process in a previous clock cycle then the method 900 ends. If, however, the assertion verification logic 508 determines that the watched data was input to the pipelined process in a previous clock cycle then the method 900 proceeds to block 904.

At block 904, the assertion verification logic 508 determines whether the watched data has already been output from the pipelined process. In some cases the assertion verification logic 508 may determine whether the watched data has been output from the pipelined process based on the status of the watched data output register 512. For example, the assertion verification logic 508 may determine that the watched data has been output from the pipelined process if the watched data output register 512 is set. If it has been determined that the watched data has been output from the pipelined process then the method 900 ends. If, however, it is determined that the watched data has not been output from the pipelined process, then the method 900 proceeds to block 906.

At block 906, the assertion verification logic 508 determines whether the watched data is output from the pipelined process in the current clock cycle. In some cases, the assertion verification logic 508 determines whether the watched data is output from the pipelined process based on the data and the control signal(s) output from the pipelined process. For example, the assertion verification logic 508 may determine that the watched data is output from the pipelined process in the current clock cycle if the output data is equal to the watched data and the enable and valid signals are high. If it is determined that the watched data is output from the pipelined process then the method 900 proceeds to block 908. If, however, it is determined that the watched data is not output from the pipelined process in the current clock cycle then the method 900 ends.

At block 908, the assertion verification logic 508 determines whether the current clock cycle is a non-progressing clock cycle for the watched data. The assertion verification logic 508 may determine whether the current clock cycle is a non-progressing clock cycle for the watched data in the same manner as the clock cycle tracking logic 506. For example, the assertion verification logic 508 may determine that the current clock cycle is a progressing clock cycle for the watched data based on the status of the external event signal(s). If the assertion verification logic 508 determines that the current cycle is not a progressing clock cycle for the watched data then the method 900 ends. If, however, the assertion verification logic 508 determines that the current clock cycle is a progressing clock cycle for the watched data then the method 900 proceeds to block 910.

At block 910, the assertion verification logic 508 determines whether the counter is equal to a predetermined number (or one of a plurality of predetermined numbers). If the counter is equal to the predetermined number (or one of the predetermined numbers) then the predetermined number of progressing clock cycles have occurred for the watched data since the watched data was input to the pipelined process. The predetermined number is the number of progressing clock cycles that it will take for the watched data to appear on the output. The predetermined number may be equal to the number of stages in the pipeline or it may be another number. If the counter is equal to the predetermined number (or one of the predetermined numbers) then the watched data has been output from the pipeline at the correct time and the method 900 ends. If, however, the counter is not equal to the predetermined number (or one of the predetermined numbers) the watched data has not been output from the pipeline at the correct or expected time and there is an error in the pipeline control path and the method 900 proceeds to block 912 where an error is output.

It is noted that when the pipeline control path verification system 118 is implemented in a formal verification tool, the formal verification tool chooses all possible (e.g. valid) watched data values and for a given watched data value tries all combinations of 'when' or 'which clock cycle' the watched data is input to the pipelined process. Accordingly, the formal verification tool verifies all options of watched data and for each possible watched data evaluates all possible combinations to determine if there is a scenario where the assertion is not true.

Figure 10:
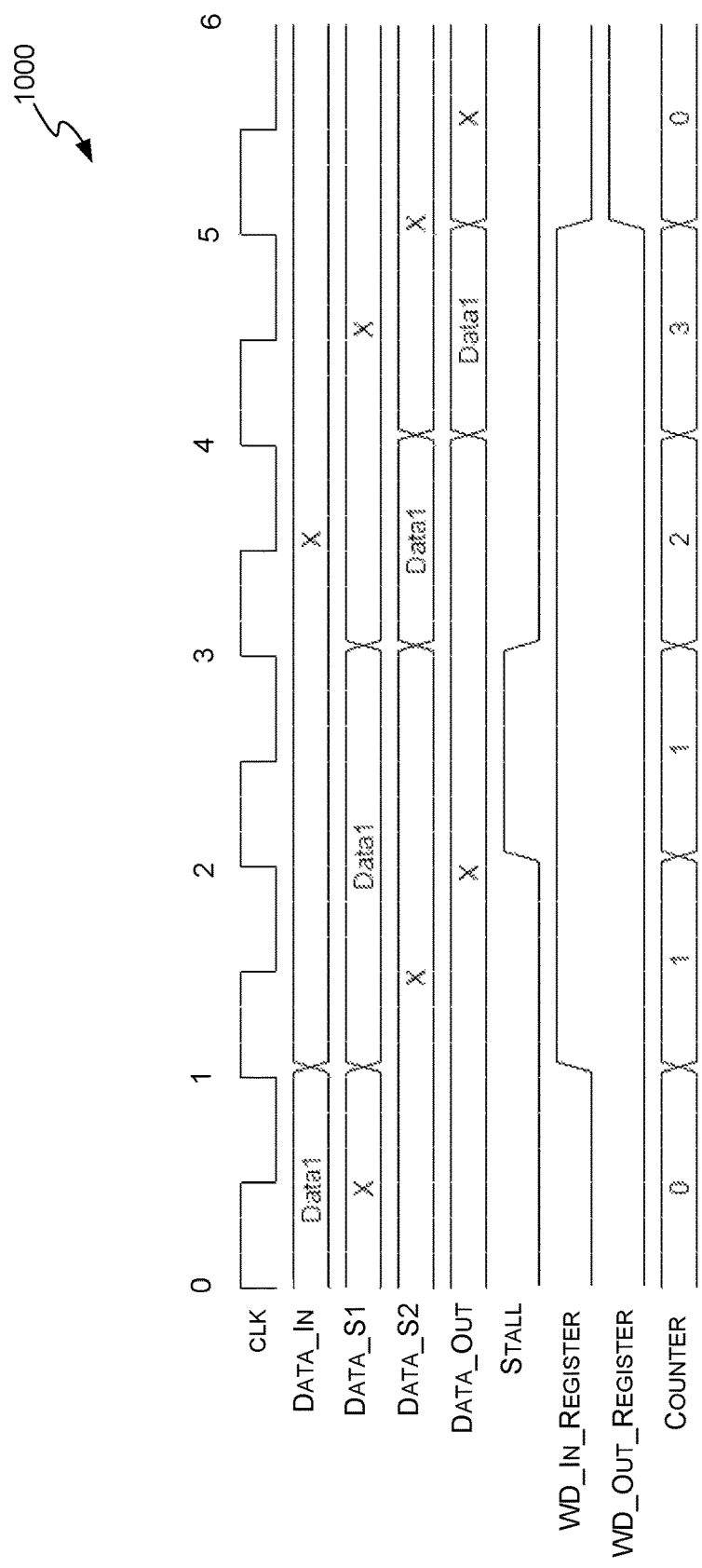
FIG. 10. is a timing diagram illustrating use of the system of FIG. 5 to verify logic for implementing a pipelined process in hardware.

Reference is now made to FIG. 10 which is a timing diagram 1000 illustrating use of the pipeline control path verification system 118 of FIG. 5 to verify the control path of the logic 101 of FIG. 1 for implementing a pipelined process in hardware. In the example of FIG. 10 Data_In is the data input to the pipelined process, Data_S1 is the data output from stage 1 of the pipeline, Data_S2 is the data output from stage 2 of the pipeline and Data_Out is the data output from the pipelined process, Stall is an external event signal indicating a global stall (i.e. the stall affects all data in the pipeline)—there are no other external events in this example, WD_In_Register is the watched data input register, WD_Out_Register is the watched data output register, Counter is the counter, and Data1 is the watched data.

In clock cycle 0 the watched data (Data1) is input to the pipelined process which causes the WD_In_Register to be set in the next clock cycle (clock cycle 1).

In clock cycle 1 there is no stall so the watched data (Data1) is output from the first stage of the pipeline and input to the second stage of the pipeline. Since the WD_In_Register is set and the clock cycle is a progressing clock cycle for the watched data (no stall signal) the counter is incremented by 1 to a value of 1.

In clock cycle 2 there is a stall so the watched data (Data1) remains as the output of the first stage of the pipeline and as the input to the second stage of the pipeline. Since the WD_In_Register is set, but the clock cycle is a non-progressing clock cycle for the watched data (because there is a stall) the counter is not incremented and remains at one.

In clock cycle 3 there is no stall so the watched data (Data1) is output from the second stage of the pipeline and is input to the third stage of the pipeline. Since the WD_In_Register is set and the clock cycle is a progressing clock cycle for the watched data (no stall) the counter is incremented by 1 to a value of 2.

In clock cycle 4 there is no stall so the watched data (Data1) is output from the pipelined process causing the WD_Out_Register to be set and the WD_In_Register to be reset in the next clock cycle (clock cycle 5). Since the WD_In_Register is set in clock cycle 4 and the clock cycle is a progressing clock cycle for the watched data, the counter is incremented by 1 to a value of 3. Since the watched data is output in this clock cycle the assertion is evaluated to determine whether the data is output at the correct time by comparing the counter value to one or more predetermined values.

It has been determined that the pipeline control path verification system described herein may be improved for long or deep pipelines by evaluating the assertion under one or more invariants which describe how data moves through the pipeline. As is known to those of skill in the art an invariant is a condition that must always occur or always be true. When a formal verification tool is evaluating a particular assertion it evaluates all possible states of the design to see if there is a state that will occur in which the assertion is not true. The number of possible states to be evaluated can be reduced if the assertion is evaluated under one or more invariants which specify how data moves or progresses in the pipeline. In particular, one or more invariant assertions may be used to specify where the watched data is expected to be in the pipeline relative to the number of progressing clock cycles that have occurred for the watched data. By specifying where the watched data will be after a certain number of progressing clock cycles for the watched data the number of states that need to be evaluated is lowered, thus reducing the time to verify the pipeline.

For example, an invariant may outline that after the expected number of progressing clock cycles less one have occurred since the watched data was input to the pipelined process that the watched data is expected to be output from the second to last stage of the pipeline. For example, where a pipelined process has three stages as shown in FIG. 1 and it is expected that data is output from the pipelined process three progressing clock cycles after the data has been input to the pipelined process (i.e. the number of expected progressing clock cycles is three), an invariant can be added that specifies that after two progressing clock cycles (i.e. the expected number of progressing clock cycles-1) the watched data is expected to be output from the second stage of the pipelined process (e.g. Data_S2 is equal to the watched data).

The following is an example invariant assertion that may be used:
assert property ('clk_rst ((data_in_transit && counter==2)|→(Data S2 ==Watched Data))
where data_in_transit is equal to Watched Data Input Register && !Watched Data Output Register (i.e. that the watched data has been input to the pipelined process, but not yet output from the pipelined process).

Similar invariants can be added for each stage of the pipeline that specify where the watched data is expected to be after a certain number of progressing clock cycles for the watched data. Where there are a plurality of predetermined or expected numbers of progressing clock cycles then an invariant can be added for each possible progressing clock cycle count that is not equal to one of the predetermined or expected numbers of progressing clock cycles.

These invariants allow the pipeline control path verification system described herein to be used, for example, to verify pipelines that are only four deep (i.e. have four stages) to pipelines that are 256-deep (i.e. have 256 stages) or larger.

Figure 11:
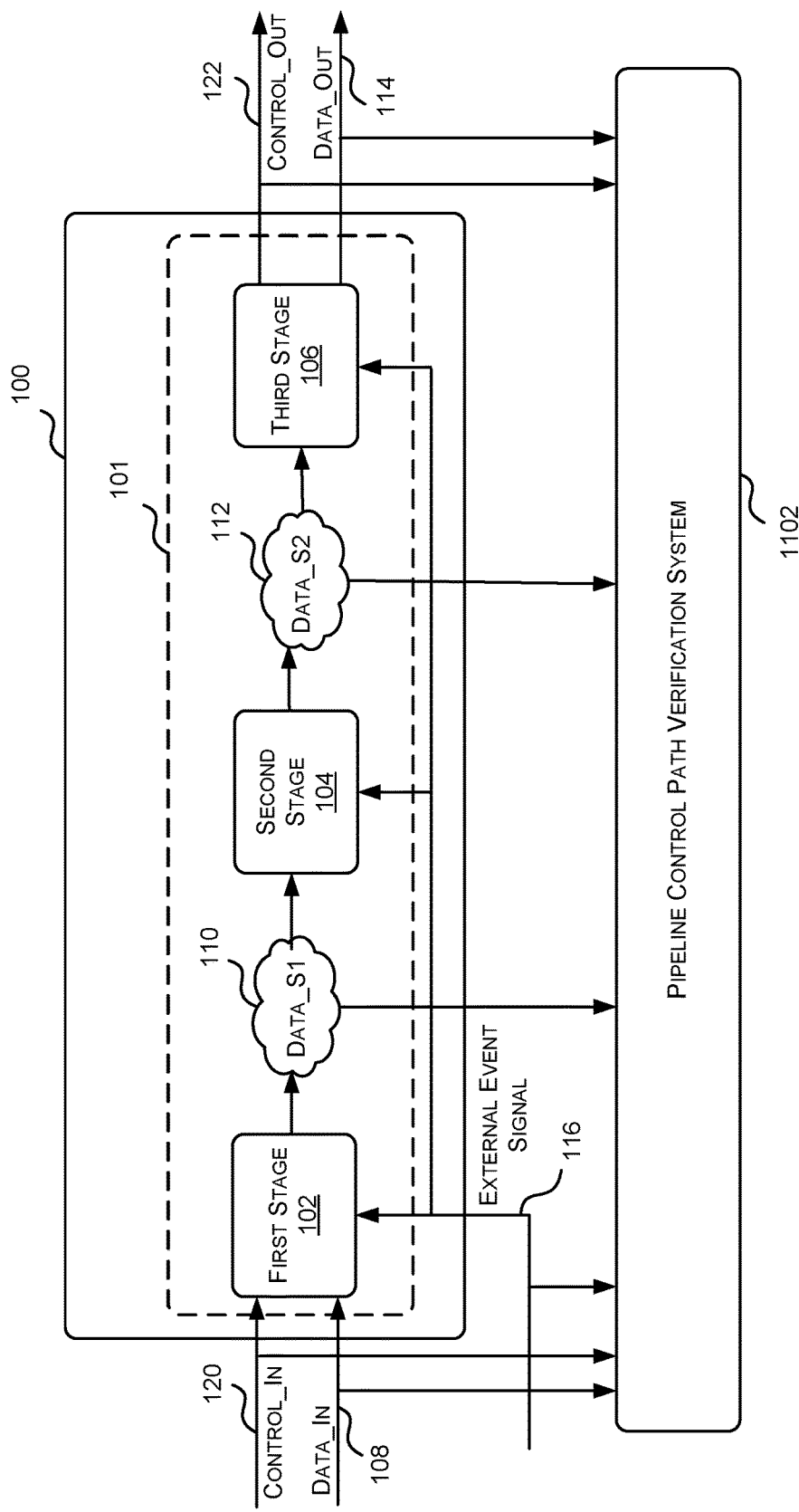
FIG. 11 is schematic diagram of another example of a pipeline control path verification system for verifying logic for implementing a pipelined process in hardware.

Since these invariants require monitoring the status and/or output of the internal stages of the pipelined process, the pipeline control path verification system 1102 is modified from the pipeline control path verification system 118 described herein to monitor the output of the different stages of the pipeline process as shown in FIG. 11.

Figure 12:
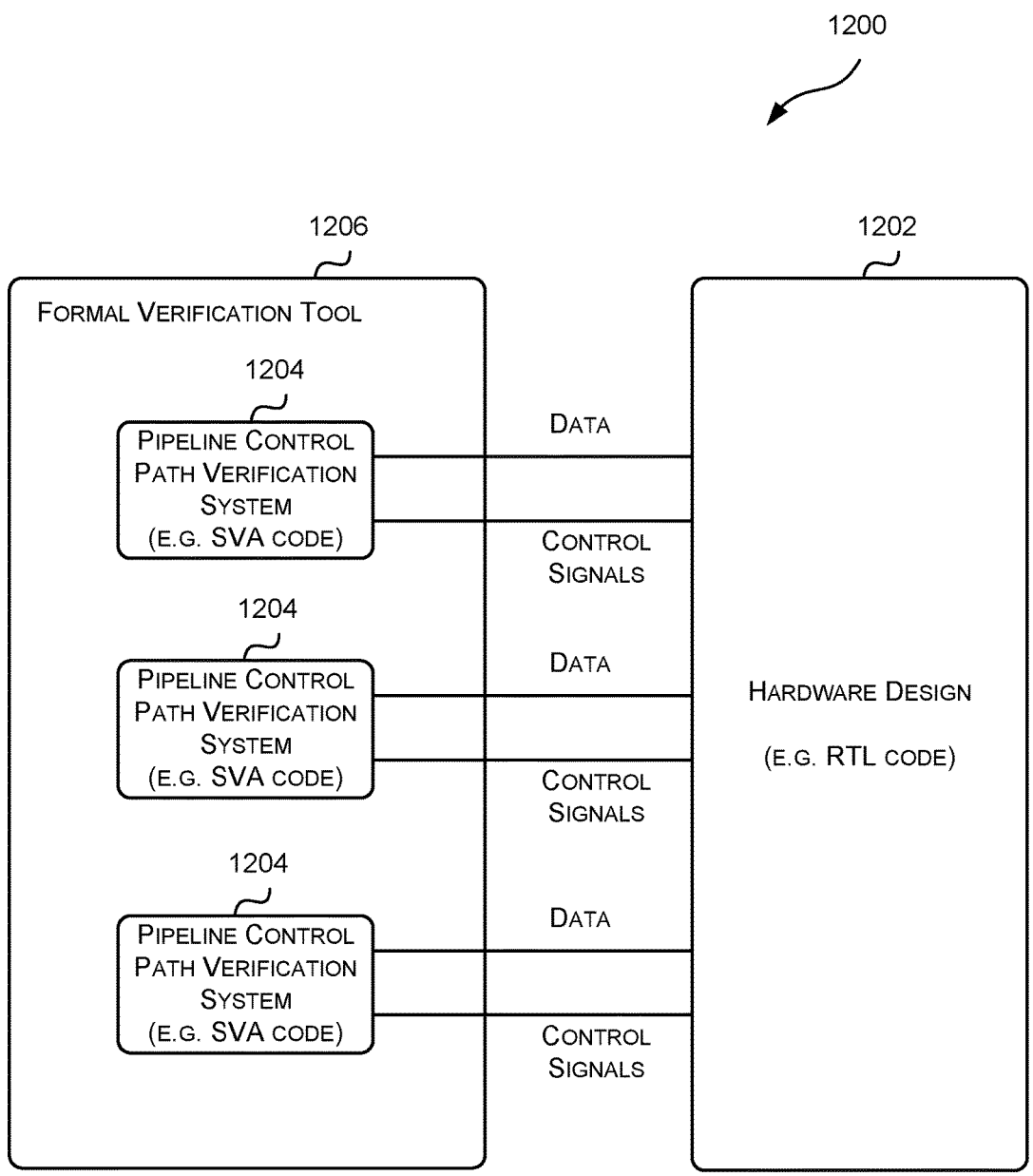
FIG. 12 is a block diagram of an example formal verification test system.
Figure 13:
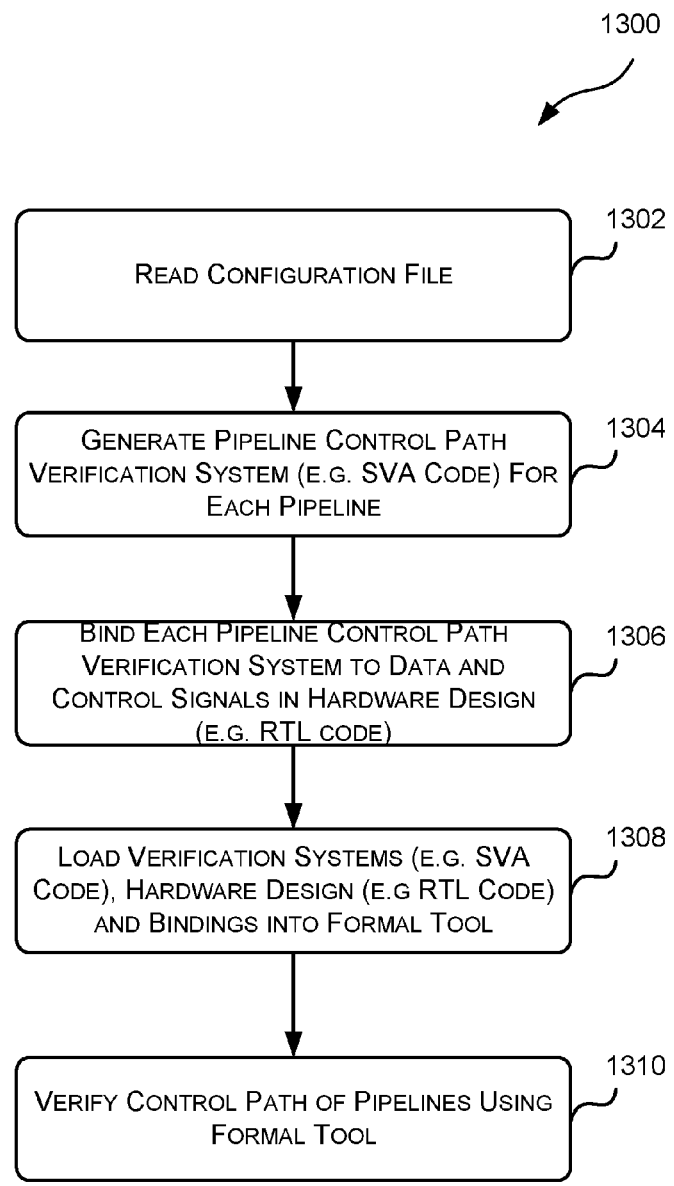
FIG. 13 is a flow diagram of an example method of verifying logic for implementing a pipelined process using the system of FIG. 12.

Reference is now made to FIGS. 12 and 13 which illustrate how the pipeline control path verification system 118 of FIG. 1 or 1102 of FIG. 11 described herein may be used in formal verification to verify the logic of a hardware design (e.g. SoC design) for implementing a pipelined process in hardware. In particular, FIG. 12 illustrates an example formal verification test system 1200 and FIG. 13 illustrates a flow diagram of a method 1300 for formally verifying the logic in a hardware design for implementing a pipelined process in hardware using the test system 1200. At block 1302 a configuration file (e.g. the specification) is read which identifies each logic in the hardware design 1202 for implementing a pipelined process in hardware (referred to as pipeline logic) and specifies the data and control signals for each pipeline logic. For each pipeline logic identified in the configuration file an instance 1204 of the pipeline control path verification system 118 or 1102 is generated at block 1304. For example, where the pipeline control path verification system 118 or 1102 is implemented in SV, an SV instance 1204 of the pipeline control path verification system is created for each identified pipeline logic using the data and control signals specified in the configuration file.

Once an instance 1204 of the pipeline control path verification system 118 or 1102 has been created for each pipeline logic, at block 1306 each instance 1204 is bound to the corresponding data and control signals of the hardware design 1202. For example, where the hardware design is implemented in RTL and the pipeline control path verification system is implemented in SV, each SV instance is bound to the corresponding data and control signals in the RTL code.

Once each pipeline control path verification system (e.g. SV instance) has been bound to the hardware design 1202 (e.g. RTL code), at block 1308 the pipeline control path verification systems 1204 (e.g. SV code), hardware design 1202 (e.g. RTL code) and bindings are loaded into a formal verification tool 1206, such as, but not limited to, Cadence IEV, Jasper's Jasper Gold, and OneSpin, to establish the test environment.

At block 1310 the formal verification tool 1206 is then used to verify the operation of the pipeline logic(s) in the hardware design 1202 (e.g. RTL code) using the defined assertions.

Once the verification is complete the hardware design may be modified based on the outcome of the verification. For example, if the verification identifies an error in the operation of the control path of the pipeline then the hardware design may be modified to correct the error. The modified hardware design may then be re-verified and once verified to be operating as expected the modified hardware design may be implemented in hardware to generate an electronic device.

Figure 14:
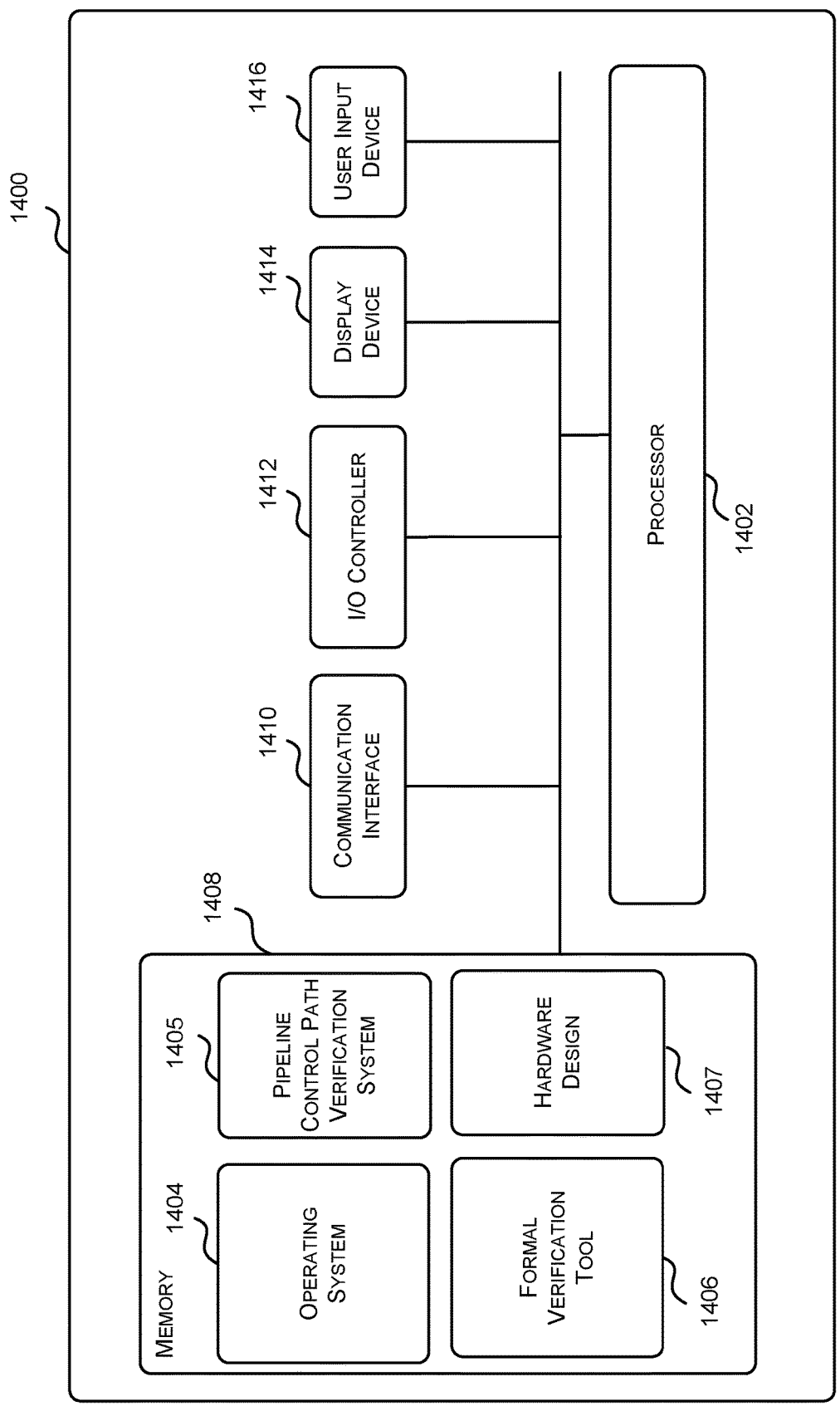
FIG. 14 is a block diagram of an example computing system.

FIG. 14 illustrates various components of an exemplary computing-based device 1400 which may be implemented as any form of a computing and/or electronic device, and in which embodiments of the pipeline control path verification system 118 or 1102 may be implemented.

Computing-based device 1400 comprises one or more processors 1402 which may be microprocessors, controllers or any other suitable type of processors for processing computer executable instructions to control the operation of the device in order to verify the operation of one or more pipelines in a design implementation. In some examples, for example where a system on a chip architecture is used, the processors 1402 may include one or more fixed function blocks (also referred to as accelerators) which implement a part of the verification method in hardware (rather than software or firmware). Platform software comprising an operating system 1404 or any other suitable platform software may be provided at the computing-based device to enable application software, such as the pipeline control path verification system 1404, a formal verification tool 1406, and the hardware design implementation 1407, to be executed on the device.

The computer executable instructions may be provided using any computer-readable media that is accessible by computing based device 1400. Computer-readable media may include, for example, computer storage media such as memory 1408 and communications media. Computer storage media (i.e. non-transitory machine readable media), such as memory 1408, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1408) is shown within the computing-based device 1400 it will be appreciated that the storage may be distributed or located remotely and accessed via a network or other communication link (e.g. using communication interface 1410).

The computing-based device 1400 also comprises an input/output controller 1412 arranged to output display information to a display device 1414 which may be separate from or integral to the computing-based device 1400. The display information may provide a graphical user interface. The input/output controller 1412 is also arranged to receive and process input from one or more devices, such as a user input device 1416 (e.g. a mouse or a keyboard). In an embodiment the display device 1414 may also act as the user input device 1416 if it is a touch sensitive display device. The input/output controller 1412 may also output data to devices other than the display device, e.g. a locally connected printing device (not shown in FIG. 14).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method to determine whether logic for implementing a pipelined process in hardware correctly moves data through the pipelined process, the method comprising:
   receiving, at a processing module, an initial hardware design comprising the logic to implement the pipelined process in hardware, wherein the initial hardware design is a processor readable dataset description of a hardware circuit, which resides in a non-transitory computer readable storage medium;
   receiving, at the processing module, a control path verification system configured to:
   monitor data input to the pipelined process to determine when watched data has been input to the pipelined process;
   in response to determining that the watched data has been input to the pipelined process, count a number of progressing clock cycles for the watched data; and
   evaluate an assertion written in an assertion based language to determine whether the logic for implementing the pipelined process in hardware correctly moves data through the pipelined process, the assertion establishing that when the watched data is output from the pipelined process the counted number of progressing clock cycles for the watched data should be equal to one of one or more predetermined values;
   exhaustively determining whether the logic for implementing the pipelined process in hardware correctly moves data through the pipelined process by formally verifying, via a formal verification tool, that the assertion is true for the initial hardware design using the control path verification system; and
   in response to determining that the logic for implementing the pipelined process in hardware does not correctly move data through the pipelined process, modifying the initial hardware design and verifying that the modified hardware design comprises logic for implementing the pipelined process in hardware that correctly moves data through the pipelined process.

2. The method of claim 1, wherein the assertion is evaluated under one or more invariants, each invariant specifying that the watched data is at a particular stage of the pipelined process when the counted number of progressing clock cycles for the watched data is equal to a specific value, the specific value not being any of the one or more predetermined values.

3. The method of claim 1, wherein the watched data is an identifier for an associated data payload.

4. The method of claim 1, wherein one of the one or more predetermined values is equal to a total number of stages of the pipelined process.

5. The method of claim 1, wherein at least one of the one or more predetermined values is equal to an expected number of progressing clock cycles for data to be output from a particular output port of the pipelined process after that data has been input to the pipelined process.

6. The method of claim 1, wherein counting the number of progressing clock cycles for the watched data comprises determining for each clock cycle whether the clock cycle is a progressing clock cycle for the watched data, and in response to determining that the clock cycle is a progressing clock cycle for the watched data, incrementing a counter.

7. The method of claim 6, wherein the determination of whether a clock cycle is a progressing clock cycle for the watched data is based at least on one or more external event control signals input to the pipelined process.

8. The method of claim 7, wherein the one or more external event control signals comprises a stall signal or an interrupt signal.

9. The method of claim 8, wherein the one or more external event control signals comprises a stall signal and in response to detecting a stall from the stall signal the counter is not incremented.

10. The method of claim 8, wherein the one or more external event control signals comprises an interrupt signal and in response to detecting an interrupt from the interrupt signal the counter is reset.

11. The method of claim 1, wherein formally verifying that the assertion is true for the initial hardware design comprises verifying that the assertion is true for each possible watched data value.

12. The method of claim 1, further comprising in response to determining that the logic correctly moves data through the pipelined process, implementing the hardware design in hardware.

13. A test system comprising:
   a pipeline control path verification system to determine whether logic for implementing a pipelined process in hardware correctly moves data through the pipelined process, the verification system comprising:
   input logic configured to monitor data input to the pipelined process to determine when watched data has been input to the pipelined process;
   clock cycle tracking logic configured to, in response to the input logic determining that the watched data has been input to the pipelined process, count a number of progressing clock cycles for the watched data; and
   assertion evaluation logic configured to evaluate an assertion written in an assertion based language to determine whether the logic for implementing the pipelined process in hardware correctly moves data through the pipelined process, the assertion establishing that when the watched data is output from the pipelined process the counted number of progressing clock cycles for the watched data should be equal to one of one or more predetermined values; and
   a formal verification tool configured to:
   receive an initial hardware design comprising logic for implementing a pipelined process in hardware, wherein the initial hardware design is a processor readable dataset description of a hardware circuit, which resides in a non-transitory computer readable storage medium;
   exhaustively determine whether the logic of the initial hardware design correctly moves data through the pipelined process by formally verifying that the assertion is true for the initial hardware design using the pipeline control path verification system;
   subsequent to determining that the logic of the initial hardware design does not correctly move data through the pipelined process, receive a modified version of the initial hardware design; and
   verify that the logic of the modified hardware design correctly moves data through the pipelined process.

14. The system of claim 13, wherein the assertion evaluation logic is configured to evaluate the assertion under one or more invariants, each invariant specifying that the watched data is at a particular stage of the pipelined process when the counted number of progressing clock cycles for the watched data is equal to a specific value, the specific value not being any of the one or more predetermined values.

15. The system of claim 13, wherein at least one of the one or more predetermined values is equal to an expected number of progressing clock cycles for data to be output from a particular output port of the pipelined process after that data has been input to the pipelined process.

16. The system of claim 13, wherein the clock cycle tracking logic is configured to count the number of progressing clock cycles for the watched data by determining for each clock cycle whether the clock cycle is a progressing clock cycle for the watched data, and in response to determining that the clock cycle is a progressing clock cycle for the watched data, incrementing a counter.

17. The system of claim 16, wherein the clock cycle tracking logic is configured to determine whether a clock cycle is a progressing clock cycle for the watched data based at least on one or more external event control signals input to the pipelined process.

18. A non-transitory computer readable storage medium having stored thereon computer executable instructions that when executed cause at least one processor to perform a method to determine whether logic for implementing a pipelined process in hardware correctly moves data through the pipelined process, the method comprising:
 receiving an initial hardware design comprising the logic to implement the pipelined process in hardware, wherein the initial hardware design is a processor readable dataset description of a hardware circuit, which resides in a non-transitory computer readable storage medium;
 receiving at the processing module a control path verification system configured to:
  monitor data input to the pipelined process to determine when watched data has been input to the pipelined process,
  in response to determining that the watched data has been input to the pipelined process, count a number of progressing clock cycles for the watched data, and
  evaluate an assertion written in an assertion based language to determine that the logic for implementing the pipelined process in hardware does not correctly move data through the pipelined process, the assertion establishing that when the watched data is output from the pipelined process the counted number of progressing clock cycles for the watched data should be equal to one of one or more predetermined values;
 exhaustively determining whether the logic for implementing the pipelines process in hardware correctly moves data through the pipelined process by formally verifying, via a formal verification tool, that the assertion is true for the initial hardware design using the control path verification system; and
 subsequent to determining that the logic for implementing the pipelined process in hardware does not correctly move data through the pipelined process, receiving a modified version of the initial hardware design and verifying that the logic of the modified version correctly moves data through the pipelined process.

* * * * *